United States Patent
Jiang et al.

(10) Patent No.: US 10,965,581 B2
(45) Date of Patent: Mar. 30, 2021

(54) METHOD AND NETWORK NODE FOR OBTAINING TARGET TRANSMISSION PATH

(71) Applicant: Huawei Technologies Co., Ltd., Shenzhen (CN)

(72) Inventors: Yuanlong Jiang, Shenzhen (CN); Hengjun Zhu, Shenzhen (CN); Min Zha, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 15/982,489

(22) Filed: May 17, 2018

(65) Prior Publication Data

US 2018/0270144 A1 Sep. 20, 2018

Related U.S. Application Data

(63) Continuation of application No. PCT/CN2016/104055, filed on Oct. 31, 2016.

(30) Foreign Application Priority Data

Nov. 18, 2015 (CN) .......................... 201510796056.7

(51) Int. Cl.
*H04L 12/751* (2013.01)
*H04L 12/721* (2013.01)
(Continued)

(52) U.S. Cl.
CPC .......... *H04L 45/02* (2013.01); *H04L 43/0852* (2013.01); *H04L 45/121* (2013.01); *H04L 45/123* (2013.01); *H04L 45/70* (2013.01)

(58) Field of Classification Search
CPC combination set(s) only.
See application file for complete search history.

(56) References Cited

U.S. PATENT DOCUMENTS

2003/0103465 A1* 6/2003 Counterman ......... H04L 47/125 370/252
2006/0050635 A1* 3/2006 Yamada ................ H04J 3/0682 370/229

(Continued)

FOREIGN PATENT DOCUMENTS

| CN | 101001102 A | 7/2007 |
| CN | 101252533 A | 8/2008 |

(Continued)

OTHER PUBLICATIONS

Foreign Communication From A Counterpart Application, European Application No. 16865664.3, Extended European Search Report dated Sep. 27, 2018, 8 pages.

(Continued)

*Primary Examiner* — Philip J Chea
*Assistant Examiner* — Mohammed Ahmed
(74) *Attorney, Agent, or Firm* — Conley Rose, P.C.

(57) ABSTRACT

A method and network node for obtaining a target transmission path, where the method includes obtaining, by a first network node in a network domain, topology information of a plurality of network nodes on each path between an ingress node and an egress node that are in the network domain, obtaining, by the first network node, a transmission delay of each path according to the topology information, where the transmission delay of each path includes a sum of physical link delays between all network nodes on each path and node residence times of all the network nodes on each path, and determining, by the first network node, the target transmission path according to the transmission delay of each path.

18 Claims, 3 Drawing Sheets

(51) Int. Cl.
*H04L 12/26* (2006.01)
*H04L 12/727* (2013.01)

(56) References Cited

U.S. PATENT DOCUMENTS

| | | | |
|---|---|---|---|
| 2007/0212068 A1 | 9/2007 | Miyazaki et al. | |
| 2008/0159142 A1 | 7/2008 | Nagarajan et al. | |
| 2013/0212268 A1* | 8/2013 | Fu .................... | H04L 45/121 709/224 |
| 2015/0010090 A1 | 1/2015 | Sugimoto | |
| 2015/0188804 A1 | 7/2015 | Ashwood-Smith | |

FOREIGN PATENT DOCUMENTS

| | | |
|---|---|---|
| CN | 102447980 A | 5/2012 |
| CN | 104202081 A | 12/2014 |
| EP | 2624506 A1 | 8/2013 |
| JP | 2001333092 A | 11/2001 |
| JP | 2007243511 A | 9/2007 |
| JP | 2015012580 A | 1/2015 |

OTHER PUBLICATIONS

Machine Translation and Abstract of Japanese Publication No. JP2001333092, Nov. 30, 2001, 11 pages.
Foreign Communication From A Counterpart Application, Japanese Application No. 2018-525659, Japanese Office Action dated May 14, 2019, 5 pages.
Foreign Communication From A Counterpart Application, Japanese Application No. 2018-525659, English Translation of Japanese Office Action dated May 14, 2019, 5 pages.
Machine Translation and Abstract of Chinese Publication No. CN101001102, Jul. 18, 2007, 9 pages.
"Draft Standard for Local and Metropolitan Area Networks—Bridges and Bridged Networks—Amendment: Frame Preemption," IEEE P802.1Qbu/D2.3, Jun. 4, 2015, 39 pages.
Gunther, C., Ed., et al., "Deterministic Networking Professional Audio Requirements," draft-gunther-detnet-proaudio-req-01, Mar. 31, 2015, 12 pages.
Previdi, S., Ed. et al., "IS-IS Traffic Engineering (TE) Metric Extensions," draft-ietf-isis-te-metric-extensions-05, Apr. 14, 2015, 17 pages.
Atlas, A., et al., "Performance-based Path Selection for Explicitly Routed LSPs using TE Metric Extensions," draft-ietf-teas-te-express-path-01, Mar. 26, 2015, 10 pages.
"IEEE Standard for a Precision Clock Synchronization Protocol for Network Measurement and Control Systems, IEEE Instrumentation and Measurement Society," IEEE Std 1588™-2008, Jul. 24, 2008, 289 pages.
"K Shortest Path Routing," From Wikipedia, https://en.wikipedia.org/wiki/K_shortest_path_routing, Jan. 13, 2018, 5 pages.
Rosen, E., et al., "Multiprotocol Label Switching Architecture," RFC 3031, Jan. 2001, 61 pages.
Busi, I., Ed., et al., "Operations, Administration, and Maintenance Framework for MPLS-Based Transport Networks," RFC 6371, Sep. 2011, 62 pages.
Frost, D., et al., "Packet Loss and Delay Measurement for MPLS Networks," RFC 6374, Sep. 2011, 52 pages.
Frost, D., et al., "A Packet Loss and Delay Measurement Profile for MPLS-Based Transport Networks," RFC 6375, Sep. 2011, 5 pages.
Giacalone, S., et al., "OSPF Traffic Engineering (TE) Metric Extensions," RFC 7471, Mar. 2015, 19 pages.
Foreign Communication From A Counterpart Application, PCT Application No. PCT/CN2016/104055, English Translation of International Search Report dated Dec. 29, 2016, 2 pages.
Foreign Communication From A Counterpart Application, PCT Application No. PCT/CN2016/104055, English Translation of Written Opinion dated Dec. 29, 2016, 6 pages.
Foreign Communication From A Counterpart Application, Japanese Application No. 2018-525659, Japanese Office Action dated Jan. 21, 2020, 3 pages.
Foreign Communication From A Counterpart Application, Japanese Application No. 2018-525659, English Translation of Japanese Office Action dated Jan. 21, 2020, 3 pages.
Machine Translation and Abstract of Chinese Publication No. CN101252533, dated Aug. 27, 2008, 13 pages.
Machine Translation and Abstract of Chinese Publication No. CN104202081, dated Dec. 10, 2014, 9 pages.
Foreign Communication From a Counterpart Application, Chinese Application No. 201510796056.7, Chinese Office Action dated Apr. 30, 2019, 7 pages.

* cited by examiner

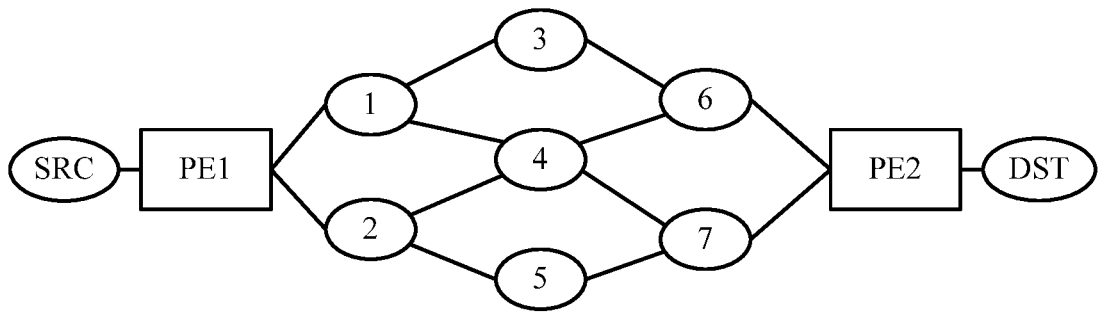

A first network node in a network domain obtains topology information of a plurality of network nodes included by each path between an ingress node and an egress node in the network domain, where the topology information includes a physical link delay between two adjacent network nodes in the plurality of network nodes and a node residence time of each of the plurality of network nodes — S110

The first network node obtains a transmission delay of each path between the ingress node and the egress node according to the topology information, where the transmission delay of each path includes a sum of the physical link delay between the two adjacent network nodes on each path and node residence times of the plurality of network nodes on each path — S120

The first network node determines a target transmission path between the ingress node and the egress node according to the transmission delay of each path — S130

FIG. 2

METHOD AND NETWORK NODE FOR OBTAINING TARGET TRANSMISSION PATH

CROSS-REFERENCE TO RELATED APPLICATIONS

This application is a continuation of International Patent Application No. PCT/CN2016/104055 filed on Oct. 31, 2016, which claims priority to Chinese Patent Application No. 201510796056.7 filed on Nov. 18, 2015. The disclosures of the aforementioned applications are hereby incorporated by reference in their entireties.

TECHNICAL FIELD

The present disclosure relates to the communications field, and in particular, to a method and network node for obtaining a target transmission path.

BACKGROUND

An Internet Protocol (IP) or Multiprotocol Label Switching (MPLS) network generally needs to support low-delay traffic, for example, a low-delay requirement on mobile carrier traffic in a fourth-generation (4G) or later-generation network, for example, a requirement of an X2 interface for a delay less than or equal to 10 milliseconds (ms) (defined in third Generation Partnership Project (3GPP)). Although a traffic bandwidth of the X2 interface accounts for only 2% to 5% of a total mobile traffic bandwidth, the delay requirement of the X2 interface is high. For another example, transmission of monitoring information and a command in a smart grid requires a constantly stable but not high bandwidth, and also requires a low delay and high reliability in the network. Otherwise, a grid fault may occur. For another example, a network delay of a multichannel audio/video in a commercial show/sports competition site needs to be less than or equal to 15 ms.

A quality of service (QoS) technology such as a differentiated service (DiffServ) is applied to a current IP or MPLS network, and traffic with different QoS requirements can be transmitted on a same path or different paths according to the different QoS requirements. However, the current IP or MPLS network is essentially a packet multiplexing network, and therefore, queuing and even congestion of high-priority packets in a queue are inevitable. Consequently, a delay may exceed a threshold in the network, and in a worst case, a packet loss occurs. Moreover, confining an end-to-end delay of traffic of a low-delay service within a specific threshold in an actual forwarding process cannot be ensured.

The Internet Engineering Task Force (IETF) already considers to take a link delay as a routing measure for the Intermediate System to Intermediate System (IS-IS) protocol and the Open Shortest Path First (OSPF) routing protocol. However, no specific link delay measurement mechanism is provided by either of the protocols, causing a disadvantage that the protocols are mainly applicable to a network environment in which a physical link transmission delay accounts for a major proportion, and are not sufficiently applicable to a metropolitan area network or a network with smaller coverage.

In the industry, there are already delay measurement technologies for measuring a 1-way delay or 2-way delay of MPLS transport profile (MPLS-TP) operation, administration, and maintenance (OAM). However, a configuration of an OAM mechanism is fixed and based on a maintenance entity group (MEG) end point (MEP). The OAM mechanism can neither be associated with a specific queue, nor measure network-wide delay paths in a distributed manner. Delay measurement of the OAM mechanism has inherent defects. For example, a service-layer OAM packet and a service packet enter a same priority queue after same QoS processing, and consequently, an instantaneous queue length affects delay measurement, a link-layer OAM packet cannot measure a node residence time. In addition, a main purpose of a service-layer OAM packet is to measure an actual delay of a service, and a channel associated with service traffic is used. This is congenitally deficient in transcendentally obtaining a path.

SUMMARY

The present disclosure provides a method for obtaining a target transmission path and a network node in order to enable the target transmission path to meet a delay requirement of a service.

According to a first aspect, a method for obtaining a target transmission path is provided. The method is applied to a network domain, and the method includes obtaining, by a first network node in the network domain, topology information of a plurality of network nodes included by each path between an ingress node and an egress node that are in the network domain, where the topology information includes a physical link delay between two adjacent network nodes in the plurality of network nodes and a node residence time of each of the plurality of network nodes, obtaining, by the first network node, a transmission delay of each path between the ingress node and the egress node according to the topology information, where the transmission delay of each path includes a sum of the physical link delay between the two adjacent network nodes on each path and node residence times of the plurality of network nodes on each path, and determining, by the first network node, a target transmission path between the ingress node and the egress node according to the transmission delay of each path.

According to the method for obtaining a target transmission path in this embodiment of the present disclosure, each network node in the network domain measures a physical link delay between each network node and a neighboring node and a node residence time. Each network node may obtain a physical link delay between other network nodes and node residence times using topology information in order to determine a target transmission path that is in the network domain and that meets a delay requirement, and transmit a low-delay service packet using the target transmission path. Therefore, this can ensure that transmission of a low-delay service in a network meets the delay requirement, and a plurality of low-delay paths between the ingress node and the egress node in the network can be fully utilized, thereby improving transmission reliability of the low-delay service.

With reference to the first aspect, in an implementation of the first aspect, the method further includes obtaining, by the first network node, topology information of all network nodes in the network domain, where the topology information of all the network nodes includes a physical link delay between two adjacent network nodes in the network domain and a node residence time of each network node in the network domain, obtaining, by the first network node, the transmission delay of each path between the ingress node and the egress node that are in the network domain according to the topology information, where the transmission delay of each path includes a sum of the physical link delay between the two adjacent network nodes on each path and node residence times of all the network nodes on each path, and determining, by the first network node, the target transmission path between the ingress node and the egress node according to the transmission delay of each path.

With reference to the first aspect and the foregoing implementation, in another implementation of the first aspect, the topology information includes first topology information, and obtaining, by a first network node in the network domain, topology information of a plurality of network nodes included by each path between an ingress node and an egress node that are in the network domain includes obtaining, by the first network node, a first physical link delay in the first topology information, where the first physical link delay is a link delay between the first network node and an adjacent first neighboring node, and obtaining, by the first network node, a node residence time that is of the first network node and that is in the first topology information.

With reference to the first aspect and the foregoing implementations, in another implementation of the first aspect, the topology information includes second topology information, and obtaining, by a first network node in the network domain, topology information of a plurality of network nodes included by each path between an ingress node and an egress node that are in the network domain includes receiving, by the first network node, the second topology information sent by a second network node in the plurality of network nodes, where the second topology information includes a second physical link delay between the second network node and a second neighboring node in the plurality of network nodes and a node residence time of the second network node, and the second neighboring node is a neighboring node of the second network node.

With reference to the first aspect and the foregoing implementations, in another implementation of the first aspect, the first network node sends the first topology information to the second network node such that the second network node determines the target transmission path according to the first topology information.

With reference to the first aspect and the foregoing implementations, in another implementation of the first aspect, obtaining, by the first network node, a node residence time that is of the first network node and that is in the first topology information includes obtaining, by the first network node, load of the first network node, and obtaining, by the first network node, the node residence time of the first network node according to the load and a mapping table, where the mapping table includes a correspondence between the load and the node residence time that are of the first network node.

With reference to the first aspect and the foregoing implementations, in another implementation of the first aspect, obtaining, by the first network node, a first physical link delay in the first topology information includes receiving, by the first network node, a delay measurement packet directly sent by the first neighboring node, where the delay measurement packet includes a sending time stamp of sending the delay measurement packet by the first neighboring node, and obtaining, by the first network node, the first physical link delay between the first network node and the first neighboring node according to a receiving time stamp of receiving the delay measurement packet and the sending time stamp in the delay measurement packet.

With reference to the first aspect and the foregoing implementations, in another implementation of the first aspect, obtaining, by the first network node, a first physical link delay in the first topology information includes receiving, by the first network node, a plurality of delay measurement packets directly sent by the first neighboring node, where each of the plurality of delay measurement packets includes a sending time stamp of sending each delay measurement packet by the first neighboring node, obtaining, by the first network node, a plurality of physical link delays between the first network node and the first neighboring node according to a receiving time stamp of receiving each delay measurement packet and the sending time stamp in each delay measurement packet, and determining, by the first network node, the first physical link delay by collecting statistics on the plurality of physical link delays.

With reference to the first aspect and the foregoing implementations, in another implementation of the first aspect, the target transmission path is used to transmit a low-delay service packet in a low-delay packet queue, and a transmission delay of the target transmission path meets a delay requirement of the low-delay service packet.

With reference to the first aspect and the foregoing implementations, in another implementation of the first aspect, determining, by the first network node, a target transmission path between the ingress node and the exist node according to the transmission delay of each path includes determining, by the first network node as the target transmission path, a path that is in all paths between the ingress node and the egress node and that is corresponding to a minimum transmission delay, where the low-delay service packet is transmitted using the target transmission path, to ensure that transmission of the low-delay service in the network meets the delay requirement.

With reference to the first aspect and the foregoing implementations, in another implementation of the first aspect, determining, by the first network node, a target transmission path between the ingress node and the exist node according to the transmission delay of each path includes determining, by the first network node as the target transmission path, one path in a plurality of paths that are in all paths between the ingress node and the egress node and whose transmission delays meet the delay requirement.

With reference to the first aspect and the foregoing implementations, in another implementation of the first aspect, determining, by the first network node, a target transmission path between the ingress node and the exist node according to the transmission delay of each path includes determining, by the first network node as the target transmission path, at least two paths in a plurality of paths that are in all paths between the ingress node and the egress node and whose transmission delays meet the delay requirement of the low-delay service packet, where each of the at least two paths separately transmits each low-delay service packet in the low-delay packet queue, thereby improving the transmission reliability of the low-delay service.

With reference to the first aspect and the foregoing implementations, in another implementation of the first aspect, determining, by the first network node, a target transmission path between the ingress node and the exist node according to the transmission delay of each path includes determining, by the first network node as the target transmission path, at least two paths in a plurality of paths that are in all paths between the ingress node and the egress node and whose transmission delays meet the delay requirement of the low-delay service packet, where the at least two paths transmit the low-delay service packet in the low-delay packet queue in a load sharing manner such that the plurality of low-delay paths between the ingress node and the egress node in the network can be fully utilized, thereby improving the transmission reliability of the low-delay service.

With reference to the first aspect and the foregoing implementations, in another implementation of the first aspect, the first network node is the ingress node or the egress node.

With reference to the first aspect and the foregoing implementations, in another implementation of the first aspect, the second network node is the ingress node or the egress node.

According to a second aspect, a network node for obtaining a target transmission path is provided, where the network node is a first network node in a network domain, and the first network node includes a first obtaining unit configured to obtain topology information of a plurality of network nodes included by each path between an ingress node and an egress node that are in the network domain, where the topology information includes a physical link delay between two adjacent network nodes in the plurality of network nodes and a node residence time of each of the plurality of network nodes, and a second obtaining unit configured to obtain a transmission delay of each path between the ingress node and the egress node according to the topology information, where the transmission delay of each path includes a sum of the physical link delay between the two adjacent network nodes on each path and node residence times of the plurality of network nodes on each path, and a determining unit configured to determine a target transmission path between the ingress node and the egress node according to the transmission delay of each path.

In a first possible implementation of the second aspect, the topology information includes first topology information, and the first obtaining unit is further configured to obtain a first physical link delay in the first topology information, where the first physical link delay is a link delay between the first network node and an adjacent first neighboring node, and the first neighboring node and the first network node belong to the plurality of network nodes, and obtain a node residence time that is of the first network node and that is in the first topology information.

With reference to the second aspect or the first possible implementation of the second aspect, in a second possible implementation of the second aspect, the topology information includes second topology information, and the first obtaining unit is further configured to receive the second topology information sent by a second network node in the plurality of network nodes, where the second topology information includes a second physical link delay between the second network node and a second neighboring node in the plurality of network nodes and a node residence time of the second network node, and the second neighboring node is a neighboring node of the second network node.

With reference to the first possible implementation of the second aspect, in a third possible implementation of the second aspect, the first obtaining unit is further configured to obtain load of the first network node, and obtain the node residence time of the first network node according to the load and a mapping table, where the mapping table includes a correspondence between the load and the node residence time that are of the first network node.

With reference to the first possible implementation of the second aspect or the third possible implementation of the second aspect, in a fourth possible implementation of the second aspect, the first obtaining unit is further configured to receive a delay measurement packet directly sent by the first neighboring node, where the delay measurement packet includes a sending time stamp of sending the delay measurement packet by the first neighboring node, and obtain the first physical link delay according to a receiving time stamp of receiving the delay measurement packet and the sending time stamp in the delay measurement packet.

With reference to the first possible implementation of the second aspect or the third possible implementation of the second aspect, in a fifth possible implementation of the second aspect, the first obtaining unit is further configured to receive a plurality of delay measurement packets directly sent by the first neighboring node, where each of the plurality of delay measurement packets includes a sending time stamp of sending each delay measurement packet by the first neighboring node, obtain a plurality of physical link delays between the first network node and the first neighboring node according to a receiving time stamp of receiving each delay measurement packet and the sending time stamp in each delay measurement packet, and determine the first physical link delay by collecting statistics on the plurality of physical link delays.

With reference to the second aspect or any possible implementation of the second aspect, in a sixth possible implementation of the second aspect, the target transmission path is used to transmit a low-delay service packet in a low-delay packet queue, and a transmission delay of the target transmission path meets a delay requirement of the low-delay service packet.

With reference to the second aspect or any possible implementation of the second aspect, in a seventh possible implementation of the second aspect, the determining unit is further configured to determine, as the target transmission path, at least two paths in a plurality of paths that are in all paths between the ingress node and the egress node and whose transmission delays meet the delay requirement of the low-delay service packet, where the at least two paths transmit the low-delay service packet in the low-delay packet queue in a load sharing manner.

The network node for obtaining a target transmission path provided in the second aspect may be configured to execute the method in the first aspect or any possible implementation of the first aspect. Further, the network node includes a unit configured to execute the method in the first aspect or any possible implementation of the first aspect.

According to a third aspect, a network node for obtaining a target transmission path is provided, including a memory and a processor. The memory is configured to store an instruction, and the processor is configured to execute the instruction stored in the memory. When the processor executes the instruction stored in the memory, the processor executes the method according to the first aspect or any possible implementation of the first aspect.

According to a fourth aspect, a computer readable medium is provided, and is configured to store a computer program. The computer program includes an instruction for executing the method according to the first aspect or any possible implementation of the first aspect.

BRIEF DESCRIPTION OF DRAWINGS

FIG. 1 is a schematic diagram of a network domain according to an embodiment of the present disclosure;

FIG. 2 is a flowchart of a method for obtaining a target transmission path according to an embodiment of the present disclosure;

DESCRIPTION OF EMBODIMENTS

Figure 3:
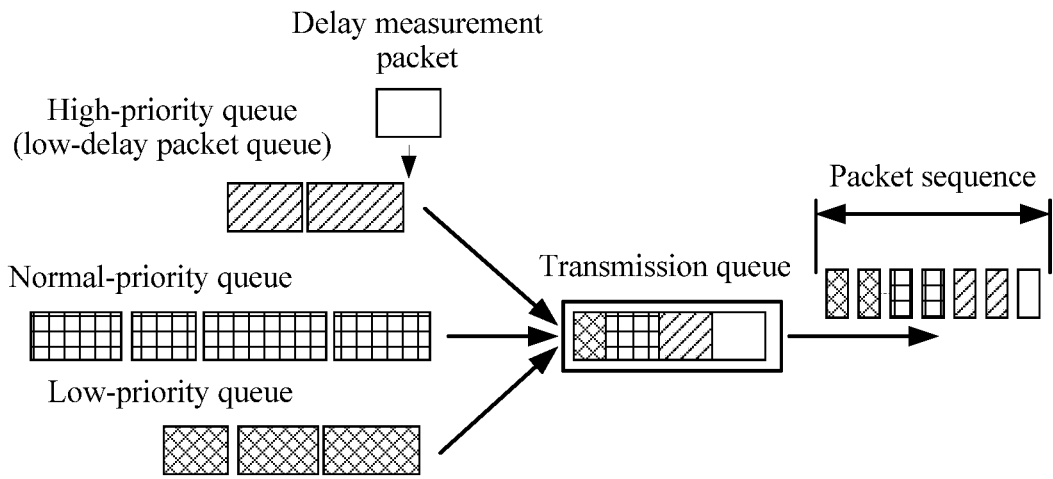
FIG. 3 is a schematic diagram of forwarding and scheduling of a delay measurement packet according to an embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure.

An IP or MPLS network may include a plurality of network nodes. As shown in FIG. 1, FIG. 1 may be considered as a partial schematic diagram of a metropolitan area network. A network domain herein may be a whole set of network nodes that are interconnected in the physical topology and that run a same routing protocol. In addition, the network domain can support a routing implementation method described in the embodiments of the present disclosure. In the network domain shown in FIG. 1, a plurality of intermediate network nodes, that is, a network node 1 to a network node 7 (designated as 1, 2, 3, 4, 5, 6 and 7 in FIG. 1), are included between a PE1 and a PE2 that are between a source (SRC) and a destination (DST). These network nodes form a plurality of transmission paths between the PE1 and the PE2. The PE1 and the PE2 are edge nodes, that is, provider edge (PE) devices.

In the metropolitan area network shown in FIG. 1, when the edge nodes PE1 and PE2 and each of the intermediate network nodes forward packets, many queues are configured to cache received packets. For example, common queues include a priority queue, a fair queue, a weighted fair queue, and the like. Each network node may arrange received packets into different queues according to different priorities of the received packets. Further, a total length and a specific scheduling mechanism of a packet queue are related to an actual configuration for device implementation and running, and this is not limited in the present disclosure.

This embodiment of the present disclosure mainly targets at a low-delay service, and a low-delay service packet has a requirement on a transmission delay. When obtaining a low-delay service packet, a network node usually arranges the low-delay service packet into a high-priority packet queue. A transmission delay of the packet queue in a transmission path from an ingress node to an egress node is less than or equal to a preset value. For example, the transmission path from the ingress node to the egress node may be a path from the PE1 to the PE2.

FIG. 2 shows a schematic flowchart of a method 100 for obtaining a target transmission path according to an embodiment of the present disclosure. The method 100 may be executed by any network node in a plurality of nodes included in a network domain. The any node herein is referred to as a first network node. For example, the first network node may be any intermediate network node in FIG. 1, that is, any node in the network node 1 to the network node 7, or the first network node may be the edge node PE1 or PE2, and this is not limited in the present disclosure. As shown in FIG. 2, the method 100 includes the following steps.

Step S110. The first network node in the network domain obtains topology information of a plurality of network nodes included by each path between an ingress node and an egress node that are in the network domain, where the topology information includes a physical link delay between two adjacent network nodes in the plurality of network nodes and a node residence time of each of the plurality of network nodes.

Step S120. The first network node obtains a transmission delay of each path between the ingress node and the egress node according to the topology information, where the transmission delay of each path includes a sum of the physical link delay between the two adjacent network nodes on each path and node residence times of the plurality of network nodes on each path.

Step S130. The first network node determines a target transmission path between the ingress node and the egress node according to the transmission delay of each path.

Further, it is assumed that each network node in the network domain can support a protocol similar to a high precision clock synchronization protocol, and can maintain high precision clock synchronization in a network for a long period. The first network node is used as an example of each of the plurality of network nodes in the network domain. The first network node may measure a physical link delay between the first network node and a neighboring node, and may further measure a node residence time of the first network node. After obtaining a physical link delay and a node residence time through measurement, each network node may send the physical link delay between each network node and a neighboring node and the node residence time of each network node to each network node in the network domain using topology information. For example, the first network node may receive a physical link delay and a node residence time of each network node that are sent by another network node, and may further send the physical link delay between the first network node and the neighboring node and the node residence time of the first network node to another node. In this way, the first network node may determine, according to the physical link delay and the node residence time of each node in the network domain, the target transmission path between the ingress node and the egress node that are in the network domain. The target transmission path meets a delay requirement and may be used to transmit a low-delay service packet.

Therefore, according to the method for obtaining a target transmission path in this embodiment of the present disclosure, each network node in the network domain measures the physical link delay between each network node and a neighboring node and the node residence time. Each network node may obtain a physical link delay between other nodes and node residence times of the other nodes using topology information in order to determine the target transmission path that is in the network domain and that meets the delay requirement, and transmit a low-delay service packet using the target transmission path. Therefore, this can ensure that transmission of a low-delay service in the network meets the delay requirement, and a plurality of low-delay paths between the ingress node and the egress node in the network can be fully utilized, thereby improving transmission reliability of the low-delay service.

In step S110, the first network node in the network domain may obtain the topology information of the plurality of network nodes included by each path between the ingress node and the egress node that are in the network domain. The topology information includes the physical link delay between the two adjacent network nodes in the plurality of network nodes and the node residence time of each of the plurality of network nodes. The first network node is any network node in the network domain, each path between the ingress node and the egress node may include a plurality of network nodes, and the plurality of network nodes on each path include the ingress node and the egress node. Optionally, the first network node may further obtain topology information of each of other network nodes included in the network domain. The topology information includes a physical link delay between each network node and a neighbor network node and a node residence time of each network node.

Further, when the first network node is a network node on any path between the ingress node and the egress node, the topology information obtained by the first network node may include first topology information and may further include second topology information. The first topology information is obtained by the first network node, and the first topology information includes a first physical link delay between the first network node and a first neighboring node and the node residence time of the first network node. The first neighboring node is a neighboring node of the first network node and is also on the path between the ingress node and the egress node. The second topology information is sent by a second network node and received by the first network node. The second network node is another network node in the network domain except the first network node. The second network node is also on the path between the ingress node and the egress node. The second topology information includes a second physical link delay between the second network node and a second neighboring node and a node residence time of the second network node. The second neighboring node is a neighboring node of the second network node and is also on the path between the ingress node and the egress node.

Optionally, when the first network node is neither the ingress node nor the egress node, the first network node may not obtain the first topology information of the first network node but obtain only topology information of network nodes included by each path between the ingress node and the egress node, that is, the second topology information of the second network node on the path between the ingress node and the egress node.

Optionally, when the first network node is neither the ingress node nor the egress node, the first network node may also obtain the first topology information of the first network node, may further obtain topology information of network nodes included by each path between the ingress node and the egress node, and may further obtain topology information of another network node not on the path between the ingress node and the egress node, that is, the first network node may obtain topology information of each network node in the network domain. In this way, regardless of any change of the ingress node and the egress node, the first network node may obtain the topology information of the network nodes included by each path between the ingress node and the egress node in order to avoid repeated topology information measurement and obtaining. However, this is not limited in this embodiment of the present disclosure.

In this embodiment of the present disclosure, an example in which the first network node obtains the first topology information is used for description. The first network node is any network node in the network domain. The first network node may perform measurement on a physical link delay by sending a delay measurement packet, that is, the first network node may obtain the first physical link delay between the first network node and the neighboring node using the delay measurement packet. Further, the first network node receives a delay measurement packet sent by the first neighboring node. The first neighboring node is adjacent to the first network node, and the delay measurement packet includes a sending time stamp of sending the delay measurement packet by the first neighboring node. Then, the first network node may obtain the physical link delay between the first network node and the first neighboring node according to a receiving time stamp of receiving the delay measurement packet and the sending time stamp in the delay measurement packet. The delay measurement packet is directly sent by the first neighboring node to the first network node.

Optionally, in an embodiment, for example, as shown in FIG. 1, if the first network node is the node 4 in FIG. 1 and the first neighboring node is the node 6 in FIG. 1, that is, a physical link delay between the node 6 and the node 4 is to be measured, the node 6 sends a delay measurement packet to the node 4, and the delay measurement packet includes a sending time stamp t1 of sending the delay measurement packet by the node 6, after receiving the delay measurement packet, the node 4 obtains a receiving time stamp t2, and may obtain the physical link delay between the node 6 and the node 4 according to the receiving time stamp t2 and the sending time stamp t1.

Optionally, for a physical link delay between any two adjacent network nodes, for example, the delay between the first network node and the first neighboring node, a delay from the first network node to the first neighboring node may be seen as equal to a delay from the first neighboring node to the first network node, that is, the delay from the first network node to the first neighboring node is equal to the delay from the first neighboring node to the first network node. Optionally, the delay from the first network node to the first neighboring node may be seen as unequal to the delay from the first neighboring node to the first network node, and the delay from the first network node to the first neighboring node and the delay from the first neighboring node to the first network node may be separately measured. This is not limited in the present disclosure.

In this embodiment of the present disclosure, a specific queuing delay of a single data packet in a queue is related to an instantaneous status of the current queue of the data packet. Measuring such a delay or changing a packet scheduling mechanism according to such a delay is of little significance. Therefore, a delay measurement packet may be inserted into the head of a low-delay service queue in order to avoid impact caused by the queue itself, and a specific queuing delay in the same low-delay service queue may be not considered. Optionally, as shown in FIG. 3, generally, a low-delay packet queue occupied by a low-delay service packet may be a high-priority queue, and the delay measurement packet may be located in the head of the low-delay packet queue, and the low-delay packet queue is followed by a queue of another priority. This is not limited in the present disclosure.

In this embodiment of the present disclosure, the physical link delay between any two adjacent network nodes may be measured a plurality of times by sending a plurality of delay measurement packets, and statistics on results of the plurality of times of measurement may be collected, for example, an average value may be obtained, an expectation value may be calculated, a maximum value may be obtained, a minimum value may be obtained, or the like in order to obtain the physical link delay between the two adjacent network nodes. Further, the first neighboring node sends a plurality of delay measurement packets to the first network node. The plurality of delay measurement packets may be sent at a same time interval, or be sent randomly, that is, the plurality of delay measurement packets are sent at random-number intervals in order to perform a plurality of times of measurement on the physical link delay. This is not limited in the present disclosure.

In this embodiment of the present disclosure, because a residence time of a packet on a network node is closely related to actual load of the network node, a residence time of a delay measurement packet may be very short on a no-load network node but may be relatively long on a nearly-full-load network node. Therefore, to more precisely reflect a residence time of a packet, a residence time of each network node may be obtained by querying a mapping table including a correspondence between node load and a residence time. In addition, a node residence time of a network node may further be determined by a network topology structure, a link medium, a link length, and a device implementation of the node itself.

Further, the mapping table including a correspondence between node load and a residence time of each network node in a network domain may be pre-established on each network node or the mapping table may be obtained through online measurement. This is not limited in the present disclosure. For example, for any network node, the mapping table including a correspondence between load and a residence time of this network node is as follows: (0%, 0 ms); (10%, 0.01 ms); (20%, 0.05 ms); . . . (50%, 0.5 ms); . . . . When load of the network node is 20%, a residence time of the network node is 0.05 ms. The network node may obtain a load status in a current state, that is, the node residence time of the network node may be obtained by querying the mapping table. Load in the current state may be load at any moment or an average value of load in a period of time, or may be set as load at a specific moment. This is not limited in the present disclosure.

In this embodiment of the present disclosure, each network node may directly send the obtained node residence time of the network node to another network node, or send the mapping table including a correspondence between load and a residence time of the network node to another network node, and send a load status of the network node. In this way, the other network node may obtain, according to the load status of the network node, the node residence time of the network node by querying the mapping table. This is not limited in the present disclosure.

In this embodiment of the present disclosure, each network node in the network domain may obtain a physical link delay between each network node and a neighboring node and a node residence time of each network node. Further, for the first network node that is any network node in the network domain, the first network node may obtain the topology information. The topology information may include the first topology information and the second topology information. The first topology information is obtained by the first network node. The first topology information includes the first physical link delay between the first network node and the first neighboring node and the node residence time of the first network node. The first neighboring node is a neighboring node of the first network node. The second topology information is sent by the second network node and received by the first network node. The second network node is any network node in the network domain except the first network node. The second topology information includes the second physical link delay between the second network node and the second neighboring node and the node residence time of the second network node. The second neighboring node is a neighboring node of the second network node.

Optionally, in an embodiment, for example, as shown in FIG. 1, the node 1 separately obtains three physical link delays a physical link delay between the node 1 and the node 3, that between the node 1 and the node 4, and that between the node 1 and the PE1. The node 1 further obtains a node residence time of the node 1. The node 1 may send topology information to its neighboring node 4. The topology information includes the three physical link delays obtained by the node 1 and the node residence time of the node 1. After receiving the topology information sent by the node 1, the node 4 may forward the topology information such that each network node may further receive the topology information of the node 1. Simultaneously, the node 4 may further send topology information of the node 4 to another node. The topology information of the node 4 may include a physical link delay between the node 4 and each neighboring node and a node residence time of the node 4. Therefore, each network node in the network domain may obtain the topology information of the node 4. By analogy, each node in the network domain may obtain topology information of all network nodes in the network domain.

In this embodiment of the present disclosure, a network node may transmit topology information using an extended distributed routing protocol. For example, the routing protocol may be an existing protocol such as OSPF, IS-IS, provided that a new routing capability is extended and parameters including the foregoing measured physical link delay and node residence time that are corresponding to each neighboring node can be carried in order to exchange routing information with another network node in the network domain.

In step S120, the first network node obtains, according to the topology information, the transmission delay of each path between the ingress node and the egress node that are in the network domain. The transmission delay of each path includes a sum of the physical link delay between the two adjacent network nodes on each path and node residence times of all network nodes on each path. Further, each network node in the network domain may obtain the topology information of all the network nodes in the network domain. Therefore, the transmission delay of each path between the ingress node and the egress node that are in the network domain may be calculated by each node in the network domain, some nodes in the network domain, any node in the network domain, or the ingress node or the egress node in the network domain. This is not limited in the present disclosure.

Optionally, in an embodiment, for example, as shown in FIG. 1, for a path PE1-1-3-6-PE2 between the ingress node and the egress node, a transmission delay of the path is equal to a sum obtained by adding a sum of four physical link delays that are respectively between the PE1 and the node 1, the node 1 and the node 3, the node 3 and the node 6, and the node 6 and the PE2 and a sum of node residence times of all the five network nodes, the PE1, the node 1, the node 3, the node 6, and the PE2. Transmission delays of all paths in the network domain are sequentially calculated. For example, as shown in FIG. 1, there are totally 12 paths between the ingress node PE1 and the egress node PE2, and any network node in the network domain can calculate the transmission delay of each path.

In step S130, the first network node determines the target transmission path between the ingress node and the egress node according to the transmission delay of each path. Further, the first network node in the network domain may determine, according to the transmission delay of each path between the ingress node and the egress node, a transmission path meeting the delay requirement as the target transmission path. Optionally, the target transmission path may be one path meeting the delay requirement or a plurality of paths that meet the delay requirement for joint transmission. Optionally, a transmission path between the ingress node and the egress node meets a delay requirement. The delay requirement may be that a transmission delay of a low-delay service packet needs to be less than or equal to a preset value. In this case, a path that is in all the paths between the ingress node and the egress node and whose transmission delay is less than or equal to the preset value may be determined as the target transmission path. The target transmission path is used to transmit a low-delay service packet in a low-delay queue.

Optionally, for each transmission path that is between the ingress node and the egress node and that meets the delay requirement, a transmission path with a minimum transmission delay may be determined as the target transmission path. For example, as shown in FIG. 1, if the PE1 is the ingress node and the PE2 is the egress node, there are totally 12 paths between the PE1 and the PE2. The transmission delay of each path is calculated to determine a transmission path with a minimum transmission delay as the target transmission path. A low-delay service packet is transmitted using the target transmission path in order to ensure that transmission of a low-delay service in the network meets the delay requirement.

Optionally, when at least two transmission paths meeting the delay requirement exist between the ingress node and the egress node, any one of the at least two transmission paths may be selected as the target transmission path.

Optionally, when at least two transmission paths meeting the delay requirement exist between the ingress node and the egress node, the at least two transmission paths may all be determined as the target transmission paths. Each low-delay service packet in a low-delay packet queue can be transmitted on each target transmission path. For example, as shown in FIG. 1, if the PE1 is the ingress node and the PE2 is the egress node, there are totally 12 paths between the PE1 and the PE2. The transmission delay of each path is calculated. It is assumed that there are totally three transmission paths, which are respectively PE1-1-3-6-PE2, PE1-1-4-7-PE2, and PE1-2-4-6-PE2, whose transmission delays meet the delay requirement. All the three transmission paths may be determined as the target transmission paths. All low-delay service packets in a low-delay packet queue are transmitted on the three paths, thereby improving transmission reliability of a low-delay service.

Optionally, when at least two transmission paths meeting the delay requirement exist between the ingress node and the egress node, the at least two transmission paths may all be determined as the target transmission paths. A low-delay service packet in a low-delay packet queue can be transmitted on each target transmission path in a load sharing manner. For example, as shown in FIG. 1, if the PE1 is the ingress node and the PE2 is the egress node, there are totally 12 paths between the PE1 and the PE2. The transmission delay of each path is calculated. It is assumed that there are totally three transmission paths, which are respectively PE1-1-3-6-PE2, PE1-1-4-7-PE2, and PE1-2-4-6-PE2, whose transmission delays meet the delay requirement. All the three transmission paths may be determined as the target transmission paths. Low-delay service packets in a low-delay packet queue are allocated, according to load in a load sharing manner, to the three target transmission paths for joint transmission, that is, some low-delay service packets are separately transmitted on each of the three target transmission paths. The three target transmission paths jointly complete transmission of the low-delay service packets. In this way, a plurality of low-delay paths between the ingress node and the egress node in the network can be fully utilized, thereby improving the transmission reliability of the low-delay service.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Therefore, according to the method for obtaining a target transmission path in this embodiment of the present disclosure, each network node in the network domain measures the physical link delay between each network node and a neighboring node, and the node residence time. Each network node may obtain a physical link delay between other nodes and node residence times of the other nodes using topology information in order to determine the target transmission path that is in the network domain and that meets the delay requirement, and transmit a low-delay service packet using the target transmission path. Therefore, this can ensure that transmission of a low-delay service in the network meets the delay requirement, and a plurality of low-delay paths between the ingress node and the egress node in the network can be fully utilized, thereby improving transmission reliability of the low-delay service.

The foregoing describes, in detail with reference to FIG. 1 to FIG. 3, the method for obtaining a target transmission path according to the embodiment of the present disclosure. The following describes, with reference to FIG. 4 to FIG. 5, a network node for obtaining a target transmission path according to an embodiment of the present disclosure.

Figure 4:
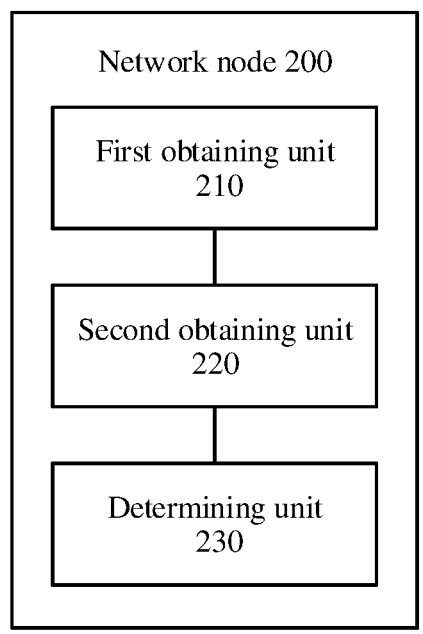
FIG. 4 is a schematic diagram of a network node for obtaining a target transmission path according to an embodiment of the present disclosure.

As shown in FIG. 4, a network node 200 for obtaining a target transmission path according to an embodiment of the present disclosure is a first network node in a network domain. The network node 200 may include a first obtaining unit 210 configured to obtain topology information of the network domain, where the topology information includes a physical link delay between every two network nodes in a plurality of network nodes and a node residence time of each of the plurality of network nodes, a second obtaining unit 220 configured to obtain, according to the topology information, a transmission delay of each path between an ingress node and an egress node that are in the plurality of network nodes, where the transmission delay of each path includes a sum of physical link delays between all network nodes on each path and node residence times of all the network nodes on each path, and a determining unit 230 configured to determine a target transmission path according to the transmission delay of each path.

Therefore, according to the network node for obtaining a target transmission path in this embodiment of the present disclosure, each network node in the network domain measures a physical link delay between each network node and a neighboring node and a node residence time. Each network node may obtain a physical link delay between other nodes and node residence times of the other nodes using topology information in order to determine a target transmission path that is in the network domain and that meets a delay requirement, and transmit a low-delay service packet using the target transmission path. Therefore, this can ensure that transmission of a low-delay service in a network meets the delay requirement, and a plurality of low-delay paths between the ingress node and the egress node in the network can be fully utilized, thereby improving transmission reliability of the low-delay service.

Optionally, the first obtaining unit 210 may further be configured to obtain topology information of all network nodes in the network domain. The topology information of all the network nodes includes a physical link delay between two adjacent network nodes in the network domain and a node residence time of each network node in the network domain.

Optionally, the topology information includes first topology information, and the first obtaining unit 210 is further configured to obtain a first physical link delay in the first topology information, where the first physical link delay is a link delay between the first network node and an adjacent first neighboring node, and the first neighboring node and the first network node belong to the plurality of network nodes, and obtain a node residence time that is of the first network node and that is in the first topology information.

Optionally, the topology information includes second topology information, and the first obtaining unit 210 is further configured to receive the second topology information sent by a second network node in the plurality of network nodes. The second topology information includes a second physical link delay between the second network node and a second neighboring node in the plurality of network nodes and a node residence time of the second network node, and the second neighboring node is a neighboring node of the second network node.

Optionally, the first obtaining unit 210 is further configured to obtain load of the first network node, and obtain the node residence time of the first network node according to the load and a mapping table. The mapping table includes a correspondence between the load and the node residence time that are of the first network node.

Optionally, the first obtaining unit 210 is further configured to receive a delay measurement packet directly sent by the first neighboring node, where the delay measurement packet includes a sending time stamp of sending the delay measurement packet by the first neighboring node, and obtain the first physical link delay between the first network node and the first neighboring node according to a receiving time stamp of receiving the delay measurement packet and the sending time stamp in the delay measurement packet.

Optionally, the first obtaining unit 210 is further configured to receive a plurality of delay measurement packets directly sent by the first neighboring node, where each of the plurality of delay measurement packets includes a sending time stamp of sending each delay measurement packet by the first neighboring node, obtain a plurality of physical link delays between the first network node and the first neighboring node according to a receiving time stamp of receiving each delay measurement packet and the sending time stamp in each delay measurement packet, and determine the first physical link delay by collecting statistics on the plurality of physical link delays.

Optionally, the target transmission path is used to transmit a low-delay service packet in a low-delay packet queue, and a transmission delay of the target transmission path meets a delay requirement of the low-delay service packet.

Optionally, the determining unit 230 is further configured to determine, as the target transmission path, a path that is in all paths between the ingress node and the egress node and that is corresponding to a minimum transmission delay.

Optionally, the determining unit 230 is further configured to determine, as the target transmission path, one path in a plurality of paths that are in all paths between the ingress node and the egress node and whose transmission delays meet the delay requirement.

Optionally, the determining unit 230 is further configured to determine, as the target transmission path, at least two paths in a plurality of paths that are in all paths between the ingress node and the egress node and whose transmission delays meet the delay requirement of the low-delay service packet. Each of the at least two paths separately transmits each low-delay service packet in the low-delay packet queue.

Optionally, the determining unit 230 is further configured to determine, as the target transmission path, at least two paths in a plurality of paths that are in all paths between the ingress node and the egress node and whose transmission delays meet the delay requirement of the low-delay service packet. The at least two paths transmit the low-delay service packet in the low-delay packet queue in a load sharing manner.

Optionally, the first network node is the ingress node or the egress node.

Optionally, the second network node is the ingress node or the egress node.

It should be understood that the network node 200 herein is implemented in a form of a functional unit. The term "unit" may be an application-specific integrated circuit (ASIC), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the network node 200 may be the first network node in the foregoing embodiment, and the foregoing and other operations and/or functions of the units in the network node 200 are respectively used to implement the corresponding procedures of the method in FIG. 2. For brevity, details are not described herein.

Therefore, according to the network node for obtaining a target transmission path in this embodiment of the present disclosure, each network node in the network domain measures a physical link delay between each network node and a neighboring node and a node residence time. Each network node may obtain a physical link delay between other nodes and node residence times of the other nodes using topology information in order to determine a target transmission path that is in the network domain and that meets a delay requirement, and transmits a low-delay service packet using the target transmission path. Therefore, this can ensure that transmission of a low-delay service in a network meets the delay requirement, and a plurality of low-delay paths between the ingress node and the egress node in the network can be fully utilized, thereby improving transmission reliability of the low-delay service.

Figure 5:
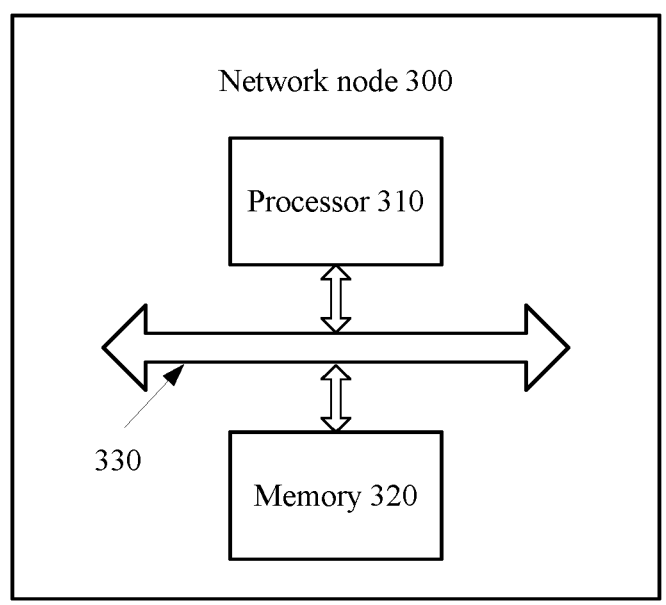
FIG. 5 is another schematic diagram of a network node for obtaining a target transmission path according to an embodiment of the present disclosure.

As shown in FIG. 5, an embodiment of the present disclosure further provides a network node 300 for obtaining a target transmission path. The network node is a first network node in a network domain including a plurality of network nodes. The network node 300 includes a processor 310, a memory 320, and a bus system 330. The processor 310 and the memory 320 are connected to each other using the bus system 330. The memory 320 is configured to store an instruction. The processor 310 is configured to execute the instruction stored by the memory 320. Optionally, the network node 300 shown in FIG. 5 may further include a communications interface (not shown in FIG. 5) configured for communication with the outside. The processor 310 may communicate with an external device using the communications interface.

The memory 320 stores program code, and the processor 310 may invoke the program code stored in the memory 320 to perform the following operations of obtaining topology information of the network domain, where the topology information includes a physical link delay between every two network nodes in the plurality of network nodes and a node residence time of each of the plurality of network nodes, obtaining, according to the topology information, a transmission delay of each path between an ingress node and an egress node that are in the plurality of network nodes, where the transmission delay of each path includes a sum of physical link delays between all network nodes on each path and node residence times of all the network nodes on each path, and determining a target transmission path according to the transmission delay of each path.

Therefore, according to the network node for obtaining a target transmission path in this embodiment of the present disclosure, each network node in the network domain measures a physical link delay between each network node and a neighboring node and a node residence time. Each network node may obtain a physical link delay between other nodes and node residence times of the other nodes using topology information in order to determine a target transmission path that is in the network domain and that meets a delay requirement, and transmit a low-delay service packet using the target transmission path. Therefore, this can ensure that transmission of a low-delay service in a network meets the delay requirement, and a plurality of low-delay paths between the ingress node and the egress node in the network can be fully utilized, thereby improving transmission reliability of the low-delay service.

It should be understood that in this embodiment of the present disclosure, the processor 310 may be a central processing unit (CPU), or the processor 310 may be another general-purpose processor, a digital signal processor (DSP), an ASIC, a field programmable gate array (FPGA), or another programmable logic device, discrete gate or transistor logic device, discrete hardware component, or the like. The general-purpose processor may be a microprocessor, or the processor may be any normal processor, or the like.

The memory 320 may include a read-only memory (ROM) and a random access memory (RAM), and provides an instruction and data for the processor 310. A part of the memory 320 may further include a nonvolatile RAM. For example, the memory 320 may further store information about a device type.

In addition to a data bus, the bus system 330 may further include a power bus, a control bus, a status signal bus, and the like. However, for clarity of description, various buses are marked as the bus system 330 in FIG. 5.

In an implementation process, the steps in the foregoing method may be completed using an integrated logic circuit of hardware in the processor 310 or an instruction in a form of software. The steps of the method disclosed with reference to the embodiments of the present disclosure may be directly performed by a hardware processor, or may be performed using a combination of hardware in the processor and a software module. A software module may be located in a mature storage medium in the art, such as a RAM, a flash memory, a ROM, a programmable ROM (PROM), an electrically erasable PROM, or a register. The storage medium is located in the memory 320. The processor 310 reads information in the memory 320, and completes the steps of the foregoing method in combination with hardware of the processor 310. To avoid repetition, details are not described herein again.

Optionally, in an embodiment, the processor 310 is further configured to obtain topology information of all network nodes in the network domain. The topology information of all the network nodes includes a physical link delay between two adjacent network nodes in the network domain and a node residence time of each network node in the network domain.

Optionally, in an embodiment, the topology information includes first topology information, and the processor 310 is further configured to obtain a first physical link delay in the first topology information, where the first physical link delay is a link delay between the first network node and an adjacent first neighboring node, and the first neighboring node and the first network node belong to the plurality of network nodes, and obtain a node residence time that is of the first network node and that is in the first topology information.

Optionally, in an embodiment, the topology information includes second topology information, and the processor 310 is further configured to receive the second topology information sent by a second network node in the plurality of network nodes. The second topology information includes a second physical link delay between the second network node and a second neighboring node in the plurality of network nodes and a node residence time of the second network node, and the second neighboring node is a neighboring node of the second network node.

Optionally, in an embodiment, the processor 310 is further configured to obtain load of the first network node, and obtain the node residence time of the first network node according to the load and a mapping table. The mapping table includes a correspondence between the load and the node residence time that are of the first network node.

Optionally, in an embodiment, the processor 310 is further configured to receive a delay measurement packet directly sent by the first neighboring node, where the delay measurement packet includes a sending time stamp of sending the delay measurement packet by the first neighboring node, and obtain the first physical link delay between the first network node and the first neighboring node according to a receiving time stamp of receiving the delay measurement packet and the sending time stamp in the delay measurement packet.

Optionally, in an embodiment, the processor 310 is further configured to receive a plurality of delay measurement packets directly sent by the first neighboring node, where each of the plurality of delay measurement packets includes a sending time stamp of sending each delay measurement packet by the first neighboring node, obtain a plurality of physical link delays between the first network node and the first neighboring node according to a receiving time stamp of receiving each delay measurement packet and the sending time stamp in each delay measurement packet, and determine the first physical link delay by collecting statistics on the plurality of physical link delays.

Optionally, in an embodiment, the target transmission path is used to transmit a low-delay service packet in a low-delay packet queue, and a transmission delay of the target transmission path meets a delay requirement of the low-delay service packet.

Optionally, in an embodiment, the processor 310 is further configured to determine, as the target transmission path, a path that is in all paths between the ingress node and the egress node and that is corresponding to a minimum transmission delay.

Optionally, in an embodiment, the processor 310 is further configured to determine, as the target transmission path, one of a plurality of paths that are in all paths between the ingress node and the egress node and whose transmission delays meet the delay requirement.

Optionally, in an embodiment, the processor 310 is further configured to determine, as the target transmission path, at least two paths in a plurality of paths that are in all paths between the ingress node and the egress node and whose transmission delays meet the delay requirement of the low-delay service packet. Each of the at least two paths separately transmits each low-delay service packet in the low-delay packet queue.

Optionally, in an embodiment, the processor 310 is further configured to determine, as the target transmission path, at least two paths in a plurality of paths that are in all paths between the ingress node and the egress node and whose transmission delays meet the delay requirement of the low-delay service packet. The at least two paths transmit the low-delay service packet in the low-delay packet queue in a load sharing manner.

Optionally, in an embodiment, the first network node is the ingress node or the egress node.

Optionally, in an embodiment, if the first network node is the ingress node, the second network node is the egress node, and if the first network node is the egress node, the second network node is the ingress node.

It should be understood that the network node 300 for obtaining a target transmission path according to this embodiment of the present disclosure may be corresponding to the network node 200 for obtaining a target transmission path in the embodiment of the present disclosure, and may be corresponding to a corresponding execution body that executes the method 100 according to the embodiment of the present disclosure. In addition, the foregoing and other operations and/or functions of the modules of the network node 300 for obtaining a target transmission path are respectively used to implement corresponding procedures of the method in FIG. 2. For brevity, details are not described herein again.

Therefore, according to the network node for obtaining a target transmission path in this embodiment of the present disclosure, each network node in the network domain measures a physical link delay between each network node and a neighboring node and a node residence time. Each network node may obtain a physical link delay between other nodes and node residence times of the other nodes using topology information in order to determine a target transmission path that is in the network domain and that meets a delay requirement, and transmit a low-delay service packet using the target transmission path. Therefore, this can ensure that transmission of a low-delay service in a network meets the delay requirement, and a plurality of low-delay paths between the ingress node and the egress node in the network can be fully utilized, thereby improving transmission reliability of the low-delay service.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Finally, it should be noted that the foregoing embodiments are merely used as examples for describing the technical solutions of the present disclosure other than to limit the present disclosure. Although the present disclosure and benefits of the present disclosure are described in detail with reference to the foregoing embodiments, a person of ordinary skill in the art should understand that the person may still make modifications to the technical solutions described in the foregoing embodiments or make equivalent replacements to some technical features thereof, without departing from the scope of the claims of the present disclosure.

What is claimed is:

1. A method for obtaining a target transmission path, applied to a network domain, comprising:
obtaining, by a first network node in the network domain, topology information of a plurality of network nodes comprised by each path between an ingress node and an egress node in the network domain, the topology information comprising a physical link delay between two adjacent network nodes in the network nodes and a node residence time of each of the network nodes, wherein the topology information further comprises first topology information, and wherein obtaining the topology information of the network nodes comprises:
 obtaining, by the first network node, a first physical link delay in the first topology information, the first physical link delay comprising a link delay between the first network node and an adjacent first neighboring node; and
 obtaining, by the first network node, a node residence time of the first network node in the first topology information;
obtaining, by the first network node, a transmission delay of each path between the ingress node and the egress node according to the topology information, the transmission delay of each path comprising a sum of the physical link delay between the two adjacent network nodes on each path and node residence times of the network nodes on each path;
determining, by the first network node, a plurality of target transmission paths between the ingress node and the egress node according to the transmission delay of each path; and
transmitting, by the first network node, a low-delay service packet using two or more of the target transmission paths.

2. The method of claim 1, wherein the topology information further comprises second topology information, wherein obtaining the topology information of the network nodes comprises receiving, by the first network node, the second topology information from a second network node in the network nodes, wherein the second topology information comprises a second physical link delay between the second network node and a second neighboring node in the network nodes and a node residence time of the second network node, and wherein the second neighboring node comprises a neighboring node of the second network node.

3. The method of claim 1, wherein obtaining the node residence time of the first network node in the first topology information comprises:
 obtaining, by the first network node, load of the first network node; and
 obtaining, by the first network node, the node residence time of the first network node according to the load and a mapping table, wherein the mapping table comprises a correspondence between the load and a node residence time of the first network node.

4. The method of claim 1, wherein obtaining the first physical link delay in the first topology information comprises:
 receiving, by the first network node, a delay measurement packet directly from the first neighboring node, wherein the delay measurement packet comprises a sending time stamp of sending the delay measurement packet by the first neighboring node; and
 obtaining, by the first network node, the first physical link delay according to a receiving time stamp of receiving the delay measurement packet and the sending time stamp in the delay measurement packet.

5. The method of claim 1, wherein obtaining the first physical link delay in the first topology information comprises:
 receiving, by the first network node, a plurality of delay measurement packets directly from the first neighboring node, wherein each of the delay measurement packets comprises a sending time stamp of sending each delay measurement packet by the first neighboring node;
 obtaining, by the first network node, a plurality of physical link delays between the first network node and the first neighboring node according to a receiving time stamp of receiving each delay measurement packet and the sending time stamp in each delay measurement packet; and
 determining, by the first network node, the first physical link delay by collecting statistics on the physical link delays.

6. The method of claim 1, wherein the low-delay service packet is transmitted in a low-delay packet queue, and wherein a transmission delay of the target transmission path meets a delay requirement of the low-delay service packet.

7. The method of claim 6, wherein determining the target transmission path between the ingress node and the egress node comprises determining, by the first network node as the target transmission path, at least two paths in a plurality of paths in all paths between the ingress node and the egress node whose transmission delays meet the delay requirement of the low-delay service packet, and wherein the at least two paths transmit the low-delay service packet in the low-delay packet queue in a load sharing manner.

8. A first network node in a network domain for obtaining a target transmission path, comprising:
 a processor; and
 a non-transitory computer-readable storage medium coupled to the processor and storing program instructions for execution by the processor, the instructions causing the processor to be configured to:
 obtain topology information of a plurality of network nodes comprised by each path between an ingress node and an egress node in the network domain, wherein the topology information comprises a physical link delay between two adjacent network nodes in the network nodes and a node residence time of each of the network nodes, wherein the topology information further comprises first topology information, and wherein obtaining the topology information of the network nodes comprises:
  obtaining, by the first network node, a first physical link delay in the first topology information, the first physical link delay comprising a link delay between the first network node and an adjacent first neighboring node; and
  obtaining, by the first network node, a node residence time of the first network node in the first topology information;
 obtain a transmission delay of each path between the ingress node and the egress node according to the topology information, wherein the transmission delay of each path comprises a sum of the physical link delay between the two adjacent network nodes on each path and node residence times of the network nodes on each path;
 determine a plurality of target transmission paths between the ingress node and the egress node according to the transmission delay of each path; and
 transmit a low-delay service packet using two or more of the target transmission paths.

9. The network node of claim 8, wherein the topology information further comprises second topology information, wherein the instructions further cause the processor to be configured to receive the second topology information from a second network node in the network nodes, wherein the second topology information comprises a second physical link delay between the second network node and a second neighboring node in the network nodes and a node residence time of the second network node, and wherein the second neighboring node comprises a neighboring node of the second network node.

10. The network node of claim 8, wherein the instructions further cause the processor to be configured to:
   obtain load of the first network node; and
   obtain the node residence time of the first network node according to the load and a mapping table, wherein the mapping table comprises a correspondence between the load and a node residence time of the first network node.

11. The network node of claim 8, wherein the instructions further cause the processor to be configured to:
   receive a delay measurement packet directly from the first neighboring node, wherein the delay measurement packet comprises a sending time stamp of sending the delay measurement packet by the first neighboring node; and
   obtain the first physical link delay according to a receiving time stamp of receiving the delay measurement packet and the sending time stamp in the delay measurement packet.

12. The network node of claim 8, wherein the instructions further cause the processor to be configured to:
   receive a plurality of delay measurement packets directly from the first neighboring node, wherein each of the delay measurement packets comprises a sending time stamp of sending each delay measurement packet by the first neighboring node;
   obtain a plurality of physical link delays between the first network node and the first neighboring node according to a receiving time stamp of receiving each delay measurement packet and the sending time stamp in each delay measurement packet; and
   determine the first physical link delay by collecting statistics on the physical link delays.

13. The network node of claim 8, wherein the low-delay service packet is transmitted in a low-delay packet queue, and wherein a transmission delay of the target transmission path meets a delay requirement of the low-delay service packet.

14. The network node of claim 13, wherein the instructions further cause the processor to be configured to determine, as the target transmission path, at least two paths in a plurality of paths in all paths between the ingress node and the egress node whose transmission delays meet the delay requirement of the low-delay service packet, and wherein the at least two paths transmit the low-delay service packet in the low-delay packet queue in a load sharing manner.

15. The method of claim 1, wherein transmitting further comprises using two or more transmission paths that are not the fastest available paths.

16. The method of claim 1, wherein transmitting further comprises using two or more transmission paths that are the fastest available paths.

17. The network node of claim 8, wherein the instructions further cause the processor to transmit using two or more transmission paths that are not the fastest available paths.

18. The network node of claim 8, wherein the instructions further cause the processor to transmit using two or more transmission paths that are the fastest available paths.

* * * * *